May 9, 1950
W. SACKVILLE
2,506,617
METHOD OF AND APPARATUS FOR LOCATING
AND TRACKING A DISTANT BODY
Filed June 23, 1938
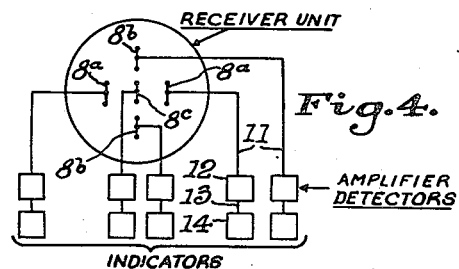
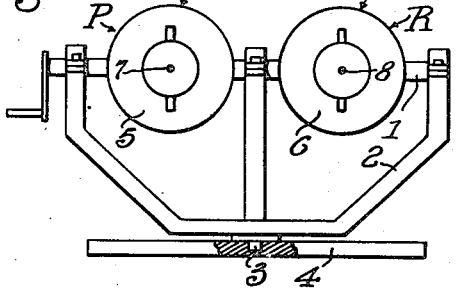
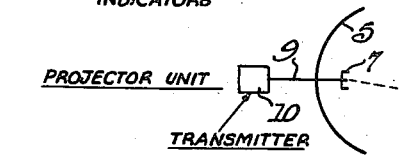
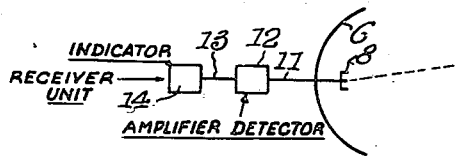
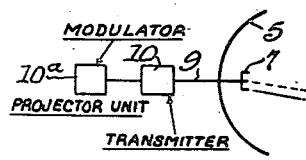
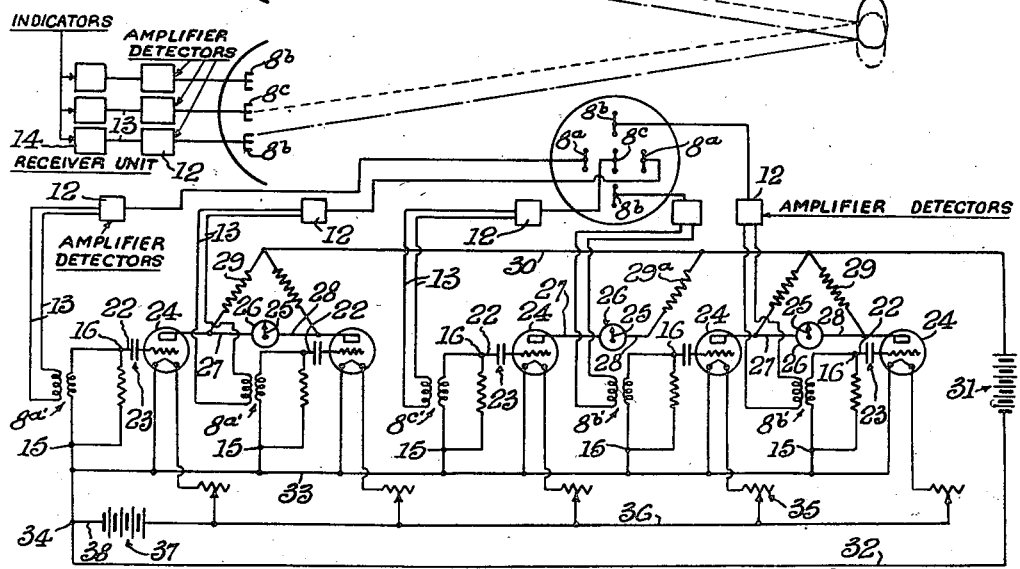
Inventor
William Sackville
By Francis T. Vanderwerker
Attorney Patented May 9, 1950

2,506,617

UNITED STATES PATENT OFFICE 2,506,617

METHOD OF AND APPARATUS FOR LOCATING AND TRACKING A DISTANT BODY

William Sackville, Berkeley, Calif., assignor to the United States of America as represented by the Secretary of War Application June 23, 1938, Serial No. 215,510

4 Claims. (Cl. 343—16)

(Granted under the act of March 3, 1883, as amended April 30, 1928; 370 O. G. 757)

This invention described herein may be manufactured and used by or for the Government for governmental purposes, without the payment to me of any royalty thereon.

The subject of this invention is a method of and apparatus for locating and tracking an invisible body.

The objects of this invention are attained broadly by sending radiant energy waves to impinge upon the body and detecting the waves reflected therefrom.

Specifically a projector unit capable of emitting a beam of ultra-short wave-lengths is associated with a receiver unit for synchronous movement therewith in azimuth and elevation so that an invisible object may be flooded with a radio beam which is reflected to the receiver. The effect on the receiver is interpreted in some physical manifestation or response that is capable of being heard or observed.

Referring to the accompanying drawings in which corresponding parts are indicated by similar reference characters Fig. 1 is a front elevation of a projector unit and receiver unit mounted for unitary movement in azimuth and elevation;

Fig. 2 shows one embodiment of the instant invention and illustrates diagrammatically a projector and a receiver unit functionally interrelated, the projector unit including a transmitter, a reflector and a radiating antenna adapted to generate and project an ultra-short wave beam of radiant energy; the receiver unit including a collector, a receiving antenna, an amplifier-detector unit and an indicator, and adapted to receive and indicate reflections of the beam from an object intercepting its path;

Fig. 3 shows a different embodiment of the instant invention and illustrates diagrammatically a projector and a receiver unit, functionally interrelated; the projector unit including a transmitter; a modulator variable within a predetermined frequency range; a reflector and a radiating antenna adapted to generate and project an ultra-short wave beam of radiant energy; the receiver unit including a collector, a plurality of receiving antennas arranged within the focal region of the collector; a series of amplifier-detector-units, and an indicator in connection with each of said units;

Fig. 4 is a view illustrating diagrammatically the arrangement of the receiving antennas in the receiver unit shown in Fig. 3 and the connections of the receiving antennas with the amplifier-detector units and the indicators; and Fig. 5 is a further modification of the instant invention and illustrates diagrammatically a receiver unit including a reflector, a series of receiving antennas within the focal region of the reflector and shows opposite pairs of the receiving antennas connected in opposed relation through their respective amplifier-detector units across the terminals of a two-way indicator.

Referring to the drawings by characters of reference there is provided a projector unit P and a receiver unit R arranged to move in unison in both azimuth and elevation in any desired manner a simple one being herein shown as an illustration wherein the units are mounted on a horizontal shaft 1 journaled in a yoke 2 which is pivotally mounted at 3 on a base 4. From the foregoing it is evident that rotation of the shaft 1 through any suitable and well known means, not shown, will cause the units P and R to move in elevation while rotations of the yoke 2 on its pivot 3 will cause the units to move in azimuth.

While in the above-described form of mounting, the units P and R are mounted rigidly side by side it is to be understood that they may be separated sufficiently to prevent pick-up of the direct wave or beam effect. In this case, the units are synchronously operated by means of any of the several known automatic electric transmission systems.

With reference to Figs. 1 and 2 of the drawings the projector unit P may conveniently include a parabolic reflector 5 or other radio reflector. When the reflector 5 of the projector unit is directed at an object such as an airplane, the waves will be reflected by the airplane and collected by the reflector 6 of the receiver unit R.

The projector and receiver antennae 7 and 8 respectively are located at the focii of the reflectors the axes preferably lying along the optical axes of the reflectors so that the beam may be symmetrical and of maximum strength.

Connected through the usual leads 9 to the antenna 7 of the projector P is an ultra-high radio frequency transmitter 10 while to the antenna 8 of the receiver R is connected through the usual leads 11 an amplifier-detector 12. The output circuit 13 of the amplifier-detector 12 is connected to an indicator 14 which may be a galvanometer or similar instrument for registering the signal visually.

The use of single antennae at the focii of the reflectors together with the associated equipment allows for the detection of an object. However, it does not give a positive means for tracking a moving object.

To overcome this defect it is proposed to employ in connection with the projector unit P shown in Figs. 1 and 2 of the drawings a receiver unit having an antenna system consisting of a plurality of receiving antennae 8a—8a, 8b—8b and 8c as shown in Figs. 3, 4 and 5. The center one 8c receives reflected energy when the object is on a prolongation of the axis of the reflector. Its function is to check the exact location of the object. When the axis of the reflector leaves the object, the reflected energy moves away from the focus and impinges upon one or two of the outer antennae 8a—8a, 8b—8b as shown in Fig. 3 of the drawings, thus affording lateral and vertical indications of azimuth and elevation.

Each antenna is connected through an amplifier detector 12 to an indicator 14, as clearly shown in Figs. 3 and 4 of the drawings. An object may thus be tracked by means of the directional effect manifested by the indicators.

With further reference to the arrangement shown in Figs. 3 and 4 the transmitter 10 of the projector unit P includes a system which modulates the carrier wave with a modulator which is continuously variable within the frequency range $f_1$ to $f_5$, as will be understood without further discussion. In order to receive the signals at frequencies $f_1$ to $f_5$, each of the amplifier-detectors 12 connected to the receiving antennae 8a—8a and 8b—8b and 8c is tuned to one of the frequencies $f_1$ to $f_5$, but all of the amplifier-detector units must be within the tuning range $f_1$—$f_5$ of the projector modulator. By this system, each antenna as shown in Figs. 3, 4 and 5 would be exposed to a portion of the field of view covered by the projector beam and the receiver ensemble would cover the total beam. The advantage over the previous method is that interference effects as between receiver units would be minimized since not more than one unit could respond at the same time.

The system shown in Figs. 3 and 4 is suitable where units P and R are sufficiently separated to prevent pick-up of the direct wave. However, when using a side by side mounting, in order to minimize direct pick-up from the beam, it is preferable to employ the modification shown in Fig. 5 of the drawings.

In the modification shown in Figs. 3 and 4 two oppositely paired antennae are exposed to the adjacent portions of the field of view of the receiver reflector, that is to say, portions of the field of view on opposite sides of and above and below the axis of the reflector. Consequently, they are exposed to adjacent portions of the projector beam. Under these conditions, if a paired antenna 8a—8a, 8b—8b be connected opposed across the terminals of a two-way indicator, as shown in Fig. 5 of the drawings, the opposition wiring will cause most of the direct pick-up of the beam to be cancelled. However, when an object appears in the beam, the arrival of the reflected energy falling on one of the pair of antennae produces a manifestation of directional effect in the two-way recorder which affords a means for maintaining the receiver reflector centered on the reflecting object.

The above positioning of receiver antennae is for the purpose of obtaining the directional effect of a moving object, and the principle is identical with the principle of the apparatus described and shown in Patent No. 2,459,185, issued January 18, 1949. Their variation lies in the fact that they are to be used for detection in different parts of the radiation spectrum. In Fig. 5 the receiving antennas 8a—8a, 8b—8b and 8c of the receiver unit R are shown connected to the amplifier-detectors 12 and the output of the amplifier-detectors to the input terminals of coupling coils 8a'—8a', 8b'—8b', and 8c', the output terminals of which are connected to binding posts 15 and 16. The binding posts 16 are connected through lead wires 22, in each of which is interposed a condenser 23, to the grids of the triodes 24. Condensers 23 are so chosen that the capacity thereof will prevent a permanent change of bias on the grids but, at the same time, allow a varying circuit voltage to pass to the grids. Such a condition will prevent the needles 25 of the two-way reading galvanometers 26—26 drifting from their zero positions due to minor changes in circuit, while at the same time it will cause movement of the needles due to the reception of an unequal amount of energy stimulus by the paired receiving antennas. Thus the indicator is activated only when a varying voltage is applied to one of the two paired grids of the triodes.

Galvanometers 26—26 are connected across the plates of respective pairs of tubes through lead wires 27—27 and 28—28. Resistances 29 herein shown as of 100,000 ohms are connected at one end to the wires 27 and 28 and at the other to a lead wire 30 from the positive terminal of the battery 31. The other terminal of battery 31 is connected through wire 32 to the binding post 15. Resistance 29a, likewise of 100,000 ohms, is connected to lead 28 of galvanometer 26.

The minus terminals of the filaments of the triodes 24, through the lead wire 33 are connected to the lead 32 at 34 while the plus terminals of said filaments are connected through variable resistances 35 to lead wire 36 connected to the plus terminal of a source of electrical supply 37, the other terminal of which is connected through lead 38 to lead wire 32. In this connection it may be noted that the arrangement just described is based on the disclosure in Fig. 5 of the above-identified patent.

The method of this invention consists in supplying the radiations through the projector, collecting the reflected radiations in the receiver and directing them to the receiving antenna. The signal, after amplification, is visualized by means of indicators, such as galvanometers 26—26, as shown in Fig. 5 of the drawings. When the reception is a maximum on the central antenna, the object is on a prolongation of the axis of the central receiver antenna 8c. This fact will be indicated by movement of the galvanometer connected to antenna 8c, as shown in Fig. 5 of the drawings.

The location of an object is accomplished by sweeping an area with the apparatus.

It is to be understood that the dimensions of the receiving antennae and their proximity is governed by the particular wave band of the radio spectrum which is employed. Opposed paired receiver antennae are mounted with the difference in their distance from the radiating antenna of the projector unit an odd number of ½ wavelengths. The direct wave pick-up is cancelled, but the common indicator shows reception of the reflected wave.

While I have shown the apparatus as used in connection with the location of a fixed or moving object from a stationary point, it is obvious that it may be used on moving ships or airplanes to determine direction and location of other points or objects.

I claim:
1. In an apparatus for locating and tracking an object, a generator of ultra-short waves, means including a radiating antenna for projecting the generated waves in beam form and modulated at different signal frequencies within a predetermined frequency band, a receiver including a parabolic collector having a series of antennas grouped within its focal region, means for orienting said receiving antennas into position for maximum reception of reflected waves produced by an object intercepting the path of said projected beam, a separate indicator separately connected with and responsive to each pair of antennas, said connection including dual amplifier and detector units and being such as to place the antennas of each pair thereof in electrical opposition with respect to the indicator responsive thereto through said amplifier detector units.

2. In an apparatus for locating and tracking an object, a generator of ultra-short waves, means including a radiating antenna for projecting the generated waves in beam form and modulated at different signal frequencies within a predetermined frequency band, a receiver including a parabolic reflector having a series of antennas grouped within its focal region, the grouped antennas being arranged to provide a central focusing antenna and two pairs of supplemental antennas, the respective pairs of supplemental antennas being disposed so as to expose the antennas thereof to adjacent portions of the field of view of said collector, means for orienting said antennas into position for maximum reception of reflected waves produced by an object intercepting the path of said projected beam, an amplifier detector unit in electrical relation with each receiving antenna, a trio of indicators, means for connecting each pair of said supplemental antennas in opposed relation across the terminals of two of said indicators, and means for connecting the focusing antenna to the remaining indicator, said connections being made through said amplifier detector units.

3. In an apparatus for locating and tracking an object, a generator of ultra-short waves, means including a radiating antenna for projecting the generated waves in beam form and modulated at different signal frequencies within a predetermined frequency band, a receiver including a reflector having a focal region and a series of antennas grouped within said focal region, the grouped antennas being arranged in pairs with the respective pairs disposed to expose the antennas of each pair thereof to adjacent portions of the field of view of said reflector, means for orienting said receiving antennas into position for maximum reception of reflected waves produced by an object intercepting the path of said projected beam, and a separate indicator separately connected with and responsive to each pair of antennas, the connection being such as to place the antennas of each pair thereof in electrical opposition with respect to the indicator responsive thereto to substantially cancel out the effect of direct radiation between the radiating and the receiving antennas.

4. In an apparatus for locating and tracking an object, a generator of ultra-short waves, means including a parabolic reflector and a radiating antenna for projecting the generated waves in beam form and modulated at different signal frequencies within a predetermined frequency band, a receiver including a parabolic collector having a series of antennas grouped within its focal region, the grouped antennas being arranged in pairs with the respective pairs disposed to expose the antennas of each pair to adjacent portions of the field of view of said reflector, means for orienting said receiving antennas into position for maximum reception of reflected waves produced by an object intercepting the path of said projected beam, and a separate indicator separately connected with and responsive to each pair of antennas, the connection being such as to place the antennas of each pair thereof in electrical opposition with respect to the indicator responsive thereto to substantially cancel out the effect of direct radiation between the radiating and the receiving antennas.

WILLIAM SACKVILLE.

REFERENCES CITED

The following references are of record in the file of this patent:

UNITED STATES PATENTS

| Number | Name | Date |
| --- | --- | --- |
| 736,483 | Blochmann | Aug. 18, 1903 |
| 1,197,473 | Fuller | Sept. 5, 1916 |
| 2,085,798 | Gerhard | July 6, 1937 |
| 2,112,282 | Fritz | Mar. 29, 1938 |
| 2,116,717 | Scharlau | May 10, 1938 |
| 2,151,323 | Hollmann | Mar. 21, 1939 |
| 2,176,469 | Moueix | Oct. 17, 1939 |
| 2,203,807 | Wolff | June 11, 1940 |
| 2,415,095 | Varian | Feb. 4, 1947 |

FOREIGN PATENTS

| Number | Country | Date |
| --- | --- | --- |
| 384,325 | Great Britain | Dec. 5, 1932 |

OTHER REFERENCES

Wireless World, June 26, 1936, pages 623, 624.